United States Patent Office 3,447,010
Patented May 27, 1969

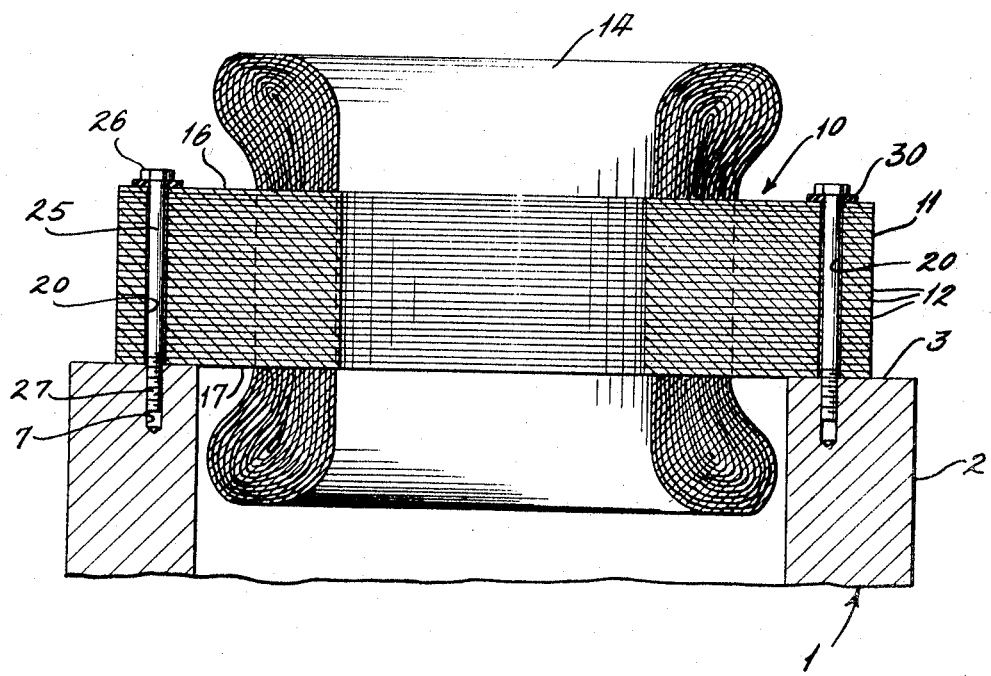

3,447,010
HERMETIC MOTOR STATOR WITH INSULATED MOUNTING BOLTS
Robert M. Vreeland, St. Louis County, Mo., assignor to Emerson Electric Co., St. Louis, Mo., a corporation of Missouri
Filed June 8, 1966, Ser. No. 556,140
Int. Cl. H02k 1/18
U.S. Cl. 310—217     1 Claim

ABSTRACT OF THE DISCLOSURE

In an electric hermetic motor assembly in which a wound stator with a core of stacked laminations is bolted in face-to-face relation to an electrically conductive base by means of a plurality of electrically conductive bolts extending entirely through the stack of laminations and into the base, integrious insulating means are provide between the bolts and at least one of the stator core and base for electrically insulating the bolts therefrom.

Background of the invention

This invention relates to electric motor assemblies of the type in which a wound stator with a core made up of a stack of laminations, is bolted in face-to-face relation to a base made of an electrically conductive material, the bolts going entirely through the stack of laminations and into the base. Refrigerator compressors commonly include such an assembly, the stator of the so-called "hermetic" motors being bolted to a cast metal base. The invention will be described as applied to such refrigerator compressor motor assemblies.

Refrigerator compressors with hermetic motors have been made for many years in large volume. The hermetic motors as they are supplied by motor manufacturers consist essentially of a wound stator the core of which is made up of a stack of laminations, and a rotor. The stator and rotor are generally shipped separately and assembled by the compressor manufacturer. In one method of assembling the motors, the stator is bolted to a metal base with a flat or flats of the base in face-to-face contact with the outer radial face of the lowermost lamination of the stator core. Bolts extending through axially aligned holes in the laminations are threaded into tapped holes in the base, and the underside of each bolt head is pulled down tightly against the upper radial face of the uppermost lamination. The bolts must be drawn down tightly to hold the stator in place, because the stator cannot be permitted to move relative to the base (hence the rotor) after the unit is sealed.

This arrangement has worked to the satisfaction of the compressor manufacturers in general because, heretofore, it was not recognized that such an arrangement did lower the motor efficiency, since no electrical problem peculiar to this arrangement was known to exist. It was considered by those who considered the matter, that the bolts formed part of a magnetic circuit of the core iron.

One of the objects of this invention is to provide an electric motor assembly of the type in which a wound stator with a core made up of a stack of laminations is bolted in face-to-face relation to a base made of an electrically conductive material, having less current and power input than such motors known heretofore, to achieve the same performance.

Other objects will become apparent to those skilled in the art in the light of the following description and accompanying drawing.

Summary of the invention

In accordance with this invention, generally stated, it was perceived that the efficiency of the motor assemblies of the type in which a wound stator, with a core made up of a stack of laminations, is bolted in face-to-face relation to a base made of an electrically conductive material, made as such motors have been made for many years, is less than it needed to have been for the reason that, contrary to what has been thought, an electric current is induced in the bolts, and passes through the bolts, the base, and the lamination with which the bolt head comes in contact, to form an electrical circuit which produces a power loss in the energized winding.

The present invention comprises the perception of the problem and its solution by interrupting the circuit by insulating electrically the bolts from at least one of either the stator or the base, which markedly improves the efficiency of the motor.

Brief description of the drawings

In the drawing, the sole figure is a fragmentary transverse sectional view through a wound stator and base of one illustrative embodiment of motor assembly of this invention.

Description of the preferred embodiment

Referring now to the drawing, reference numeral 1 indicates a cast iron base, with a hollow cylindrical body 2 with a flat upper end 3, on which a stator 10 is mounted. Tapped and threaded bolt holes 7 extend from the flat end 3 perpendicularly into the body 2.

The stator 10 has a core 11 made up of stacked laminations 12, and windings 14, shown somewhat diagrammatically, which are laid in stator slots, not here shown. The stator core 11 has a flat radial upper surface 16, defined by the upper surface of the uppermost lamination, and a flat lower radial surface 17 defined by the lower surface of the lowermost lamination. Bolt holes 20, defined by vertically aligned holes in the stacked laminations, extend axially (i.e., perpendicularly to the upper and lower surfaces 16 and 17) entirely through the core 11.

Mounting studs or bolts 25, each with a head 26 at its upper end and a threaded section 27 at its lower end, extend through the bolt passages 20, and are threaded into the threaded bolt receiving holes 7 of the base 1.

Each of the bolts 25 is electrically insulated from the core 11 by means of a washer 30 of electrically insulating material. In the illustrative embodiment shown, the washer 30 is illustrated as a simple fiber washer. However, to give the washer the requisite strength to withstand the anticipated draw down of the bolts, it may be laminated with one or more metal washers.

The washer may be laminated to the stator core face, or phosphatized, or bonded to the under-side of the head 26 of the bolt. In any event, the insulation must maintain its integrity under the conditions of installation and use, unlike the layer of varnish with which stator cores are commonly coated and which is broken by the head of the bolt under conditions known heretofore.

Alternatively, the bolt receiving hole in the base can be bushed with insulating material, or the bolt secured in a matrix of insulating material such as epoxy resin, for example, which would serve the dual purpose of insulating the bolt and cementing it securely against loosening.

Numerious other variations in the construction of the assembly of this invention within the scope of the appended claims, will occur to those skilled in the art in the light of the foregoing disclosure.

Having thus described the invention, what is claimed and desired to be secured by Letters Patent is:

1. In an electric hermetic motor assembly in which a wound stator with a core of stacked laminations is bolted in face-to-face relation to an electrically conductive base by means of a plurality of electrically conductive bolts extending entirely through the stack of laminations and into said base, the improvement comprising integrious insulating means between the bolts and at least one of the stator core and base for electrically insulating the bolts therefrom.

References Cited

UNITED STATES PATENTS

| | | | |
|---|---|---|---|
| 1,891,076 | 12/1932 | Apple | 310—66 |
| 2,406,045 | 8/1946 | Stevens | 336—210 X |
| 2,458,112 | 1/1949 | Steinmayer | 336—210 X |
| 2,501,814 | 3/1950 | Gillen | 310—216 X |
| 2,505,709 | 4/1950 | Goldberg et al. | 310—66 X |

WARREN E. RAY, *Primary Examiner.*

U.S. Cl. X.R.

310—259; 336—210